US007477135B2

(12) United States Patent
Belcher et al.

(10) Patent No.: US 7,477,135 B2
(45) Date of Patent: Jan. 13, 2009

(54) ACCESS CONTROL FOR VEHICLE-MOUNTED COMMUNICATIONS DEVICE

(76) Inventors: Brian E. Belcher, 2 Trail Ridge Dr., Melissa, TX (US) 75454; Larry L. Alexander, 912 Wilshire Ct., McKinney, TX (US) 75070

( * ) Notice: Subject to any disclaimer, the term of this patent is extended or adjusted under 35 U.S.C. 154(b) by 0 days.

(21) Appl. No.: 11/380,129

(22) Filed: Apr. 25, 2006

(65) Prior Publication Data

US 2007/0035384 A1 Feb. 15, 2007

Related U.S. Application Data

(63) Continuation-in-part of application No. 10/055,122, filed on Jan. 22, 2002, now Pat. No. 7,064,656.

(51) Int. Cl.
*B60R 25/10* (2006.01)

(52) U.S. Cl. .................................................. 340/425.5

(58) Field of Classification Search ............. 340/425.5, 340/426.2, 686.1, 426.1; 455/88, 456.1, 455/422.1, 99, 411, 405, 425, 431; 701/1
See application file for complete search history.

(56) References Cited

U.S. PATENT DOCUMENTS 5,949,345 A * 9/1999 Beckert et al. ......... 340/815.41
6,163,250 A * 12/2000 Moskowitz ............. 340/425.5
6,222,458 B1 * 4/2001 Harris ..................... 340/686.6
6,687,497 B1 * 2/2004 Parvulescu et al. .......... 455/420
6,690,940 B1 * 2/2004 Brown et al. ............. 455/456.4
2002/0065112 A1 * 5/2002 Endoh et al. ................ 455/567
2002/0137505 A1 * 9/2002 Eiche et al. ................. 455/425

* cited by examiner

*Primary Examiner*—Phung Nguyen
(74) *Attorney, Agent, or Firm*—Michael R. Nichols

(57) ABSTRACT

An access (utilization) controller to restrict or block visual or aural interaction between a vehicle operator/driver and mobile communications and information devices such as computers, mobile telephones, pagers, personal digital assistants (PDAs), and the like mounted on or used in the vehicle is disclosed. The utilization controller comprises sensors to detect motion or "potential" motion of the vehicle, a processor receiving data from the sensors and inhibitor means responsive to the processor to "blank out" or otherwise inhibit any distracting visual or aural output from the communications or information devices while the vehicle is in motion or about to move. The sensor data such as speedometer, transmission gear position indicator, antilock brakes and others are extracted from a vehicle's internal monitoring and control systems.

18 Claims, 3 Drawing Sheets

ACCESS CONTROL FOR VEHICLE-MOUNTED COMMUNICATIONS DEVICE

CROSS-REFERENCE TO RELATED APPLICATION

The present application is a continuation-in-part of U.S. Non-Provisional patent application Ser. No. 10/055,122, filed Jan. 22, 2002, the contents of which are incorporated herein by reference in their entirety.

BACKGROUND OF THE INVENTION

1. Technical Field

The present invention relates to vehicle safety devices and more particularly to a utilization controller for vehicle-borne communications devices to avoid distraction of the vehicle operator.

2. Description of the Related Art

Use of vehicle-mounted mobile communications devices has become widespread especially on dispatched service vehicles needing instructions, work orders, geographical directions, maps and other visual or aural data and on vehicles relying on location by satellite positioning systems.

The use of vehicle-mounted computers and other mobile communications devices such as mobile telephones, pagers, citizens' band (CB) radios, and various other types of information devices can easily be a distraction to the operator of the vehicle in which the devices are mounted when that vehicle is in motion. Such distractions may be so great as to be seriously hazardous. This is especially true when the devices require the vehicle operator's visual attention, reaction to an alarm condition, or other physical response.

Although sometimes necessary, in most instances it is truly unnecessary to operate such vehicle-mounted information devices while the vehicle is moving or is in a condition in which movement may be initiated inadvertently or with little conscious effort of the part of the operator. Thus, there is a need for a device to restrict a vehicle operator's ability to operate or even monitor the output of the mobile communications devices on the vehicle unless the vehicle is not moving and is in a "safe" stopped condition. The present invention provides a solution to this and other problems, and offers other advantages over previous solutions.

SUMMARY OF THE INVENTION

The present invention provides an access (utilization) controller to restrict or block visual or aural interaction between a vehicle operator/driver and mobile communications and information devices such as computers, mobile telephones, pagers, personal digital assistants (PDAs), and the like mounted on or used in the vehicle. The utilization controller comprises sensors to detect motion or "potential" motion of the vehicle, a processor receiving data from the sensors and inhibitor means responsive to the processor to "blank out" or otherwise inhibit any distracting visual or aural output from the communications or information devices while the vehicle is in motion or about to move. The sensor data such as speedometer, transmission gear position indicator, antilock brakes and others can be extracted from a vehicle's internal monitoring and control systems. Such vehicle control systems are comprised of several electronic control units (ECUs) and communicate with each other over a vehicle bus or controller area network (CAN).

The processor may be a programmable processor dedicated for a particular purpose such as those used in mobile telephones or a programmable mobile computer such as a conventional microcomputer or personal computer, having other communications and control functions. The inhibitor means may be internal to the circuitry of each device to temporarily block device use and outputs that may be dangerously distracting to the vehicle operator at that time. The inhibitor means may also be provided by a programmable mobile computer that has communications and control ability to control the output and use of other communications and information devices that may be distracting to the vehicle operator at that time.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
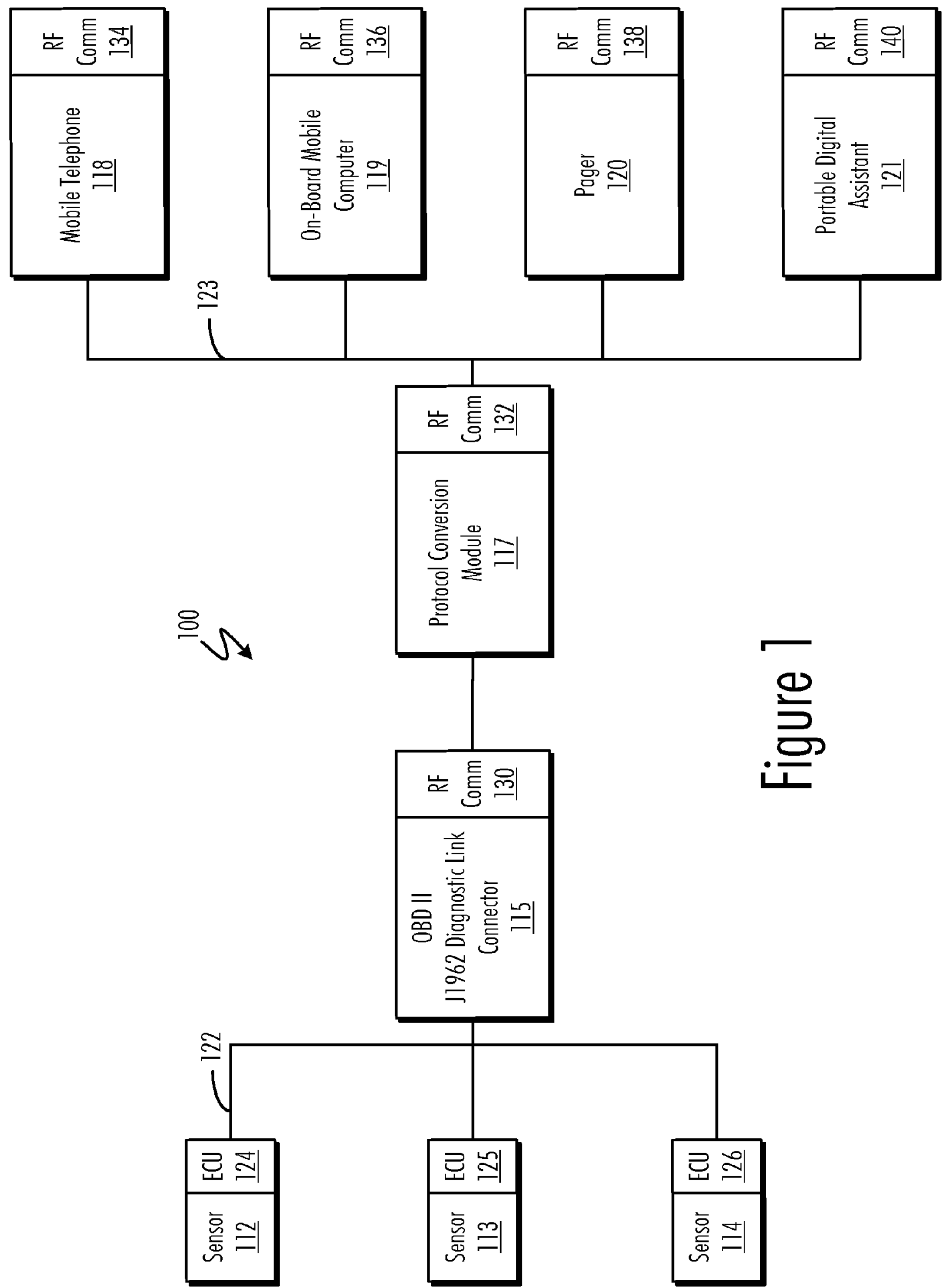
FIG. 1 is a block diagram of an access control system in accordance with a preferred embodiment of the present invention.

Referring now to FIG. 1 there is shown in block diagram a vehicle-mounted access controller system 100 according to a preferred embodiment of the present invention. The system 100 comprises one or more vehicle motion sensors 112, 113, 114, which are part of the vehicle's internal monitoring and control systems and which transfer data on the vehicle bus 122. External devices connect to the vehicle bus 122 through a Diagnostic Link Connector (DLC) 115, which is standard OEM (original equipment manufacturer) equipment required by Federal law to be installed in all vehicles. The DLC is part of an On-Board Diagnostic (OBD) system that is required for emission testing and other automotive diagnostics. The current ODB standard for passenger cars and light trucks built since 1996 is OBD II. OBD II may be replaced in future vehicles by OBD III, Controller Area Network (CAN), and other standards for transmitting information regarding a vehicle's operating status. One skilled in the art will recognize that the present invention may be implemented so as to operate with any of a potentially limitless number of vehicle diagnostic/status information protocols and without departing from the scope and spirit of the present invention.

A protocol conversion module (PCM) 117 connects to DLC 115 and translates the various OEM vehicle bus protocols to a computer-readable format (such as ASCII text) for processing. Mobile communications and information devices (e.g., mobile telephone 118, on-board mobile computer 119, pager 120, and personal digital assistant (PDA) 121) are programmed to interpret codes from PCM 117 that indicate if the vehicle is in motion or about to be in motion and inhibit any distracting visual or aural output from the devices.

Motion condition sensors 112-114 are internal to the vehicle and part of the OEM systems. Such sensors are connected to electronic control units (ECUs) 124-126 and provide such information as speedometer data, digital transmission range (DTR) data, Global Positioning System (GPS) data, and others. A speedometer sensor provides a real time velocity of the vehicle. A non-zero velocity indicates that the vehicle is in motion. The DTR data provides information as to the current selected gear setting of the automatic transmission. When the DTR data shows that the transmission is in any gear other than "Park," this is an indication that the vehicle is in motion or about to be in motion. One skilled in the art will recognize that other sensor data, including but not limited to GPS position data, may be used to determine the current motion condition of the vehicle, without departing from the scope and spirit of the present invention.

The motion sensor signals from motion condition sensors 112, 113, 114 are transferred over vehicle bus 122 and are applied to DLC 115. In this preferred embodiment, the DLC is an industry-standard connector installed as OEM equipment that is specified by the Society of Automotive Engineers (SAE). For example, SAE specification J1962 defines the connector for passenger cars and light trucks. Connectors on heavy trucks and buses might use a different SAE defined connector. PCM 117 is connected to DLC 115 either by a cable or by means of short-range radiofrequency (RF) devices (e.g., RF communications modules 130 and 132), such as BLUETOOTH-standard transceiver modules. BLUETOOTH is a registered trademark of The Bluetooth SIG, Inc. and denotes an industry standard for short-range radiofrequency communications devices. A number of commercially-available "off-the-shelf" components are available to perform the functions of PCM 117. Alternatively, PCM 117 can also be engineered from available semiconductor devices that are designed to interface to a vehicle bus, such as vehicle bus 122. Current vehicle protocols are defined by various SAE specifications such as J1850 PWM, J1850 VPW, J1708, J1939 and others. Further vehicle protocols are defined by the International Organization for Standardization (ISO) and include ISO 9141, ISO 14230 and others.

The signal from DLC 115 is applied to PCM 117, which translates the OEM protocol to a computer-readable ASCII format that is transferred to mobile communications devices 118, 119, 120, and 121 via a physical link 123 using an industry standard RS-232 serial connector, Universal Serial Bus (USB) connector, or other suitable data communications standard. Alternatively, the computer readable ASCII characters could be transmitted using short-range radiofrequency communications modules (e.g., modules 132, 134, 136, 138, and 140).

To illustrate the function and operation of PCM 117, consider the following example: In a General Motors vehicle utilizing the J1850 VPM Class 2 protocol, PCM 117 would translate the message traffic presented on DLC 115 to a hexadecimal format in standard ASCII characters, which would allow On-Board Mobile Computer 119, with appropriate programming, to watch for the DTR code that signals that the automatic transmission has been shifted out of "Park". Once this event is detected, On-Board Mobile Computer 119 would issue computer commands to inhibit the use of On-Board Mobile Computer 119 by "blanking" the screen and disabling the keyboard or by disabling input or output to/from any appropriate computer interfaces or input/output ports. Once the programming in On-Board Mobile Computer 119 detects that the vehicle has been shifted into "Park", normal operation of the On-Board Mobile Computer 119 is restored.

As another example, assume that mobile telephone 118 receives messages from PCM 117 via RF communications module 134. Mobile telephone 118 is programmed to monitor for the same DTR message to determine whether the vehicle has been shifted out of "Park." Mobile telephone 118, once having been notified by PCM 117 that the vehicle is no longer in "Park," would disable itself in such a manner as to not receive or initiate a call until the vehicle is once again in "Park" or the phone has been taken out of the vehicle a suitable distance that exceeds the range of the RF communications system employed. Alternatively, the programming in mobile computer 119 or mobile telephone 118 could look for the message traffic on vehicle bus 122 that represents velocity (via physical link 123 or via short-range radio, as appropriate) and use that message traffic as a trigger for inhibiting/enabling the use of said devices.

Alternatively the signal that controls the utilization of a devices 118, 119, 120, 121 may be generated by On-Board Mobile Computer 119 through software programming of the computer hardware. Computer 119 may be a personal computer (microcomputer), or other computer or microcontroller used as a communications or control device. An example of a computer system that may be utilized as computer 119 is provided in FIG. 3, infra. Computer 119, when acting as such a "control computer," may be programmed to watch for message traffic on vehicle bus 122 (via physical link 123 or via short-range radio, as appropriate) and then issue commands to inhibit other devices 118, 120, and 121 via a physical or wireless link (e.g., physical link 123).

Figure 2:
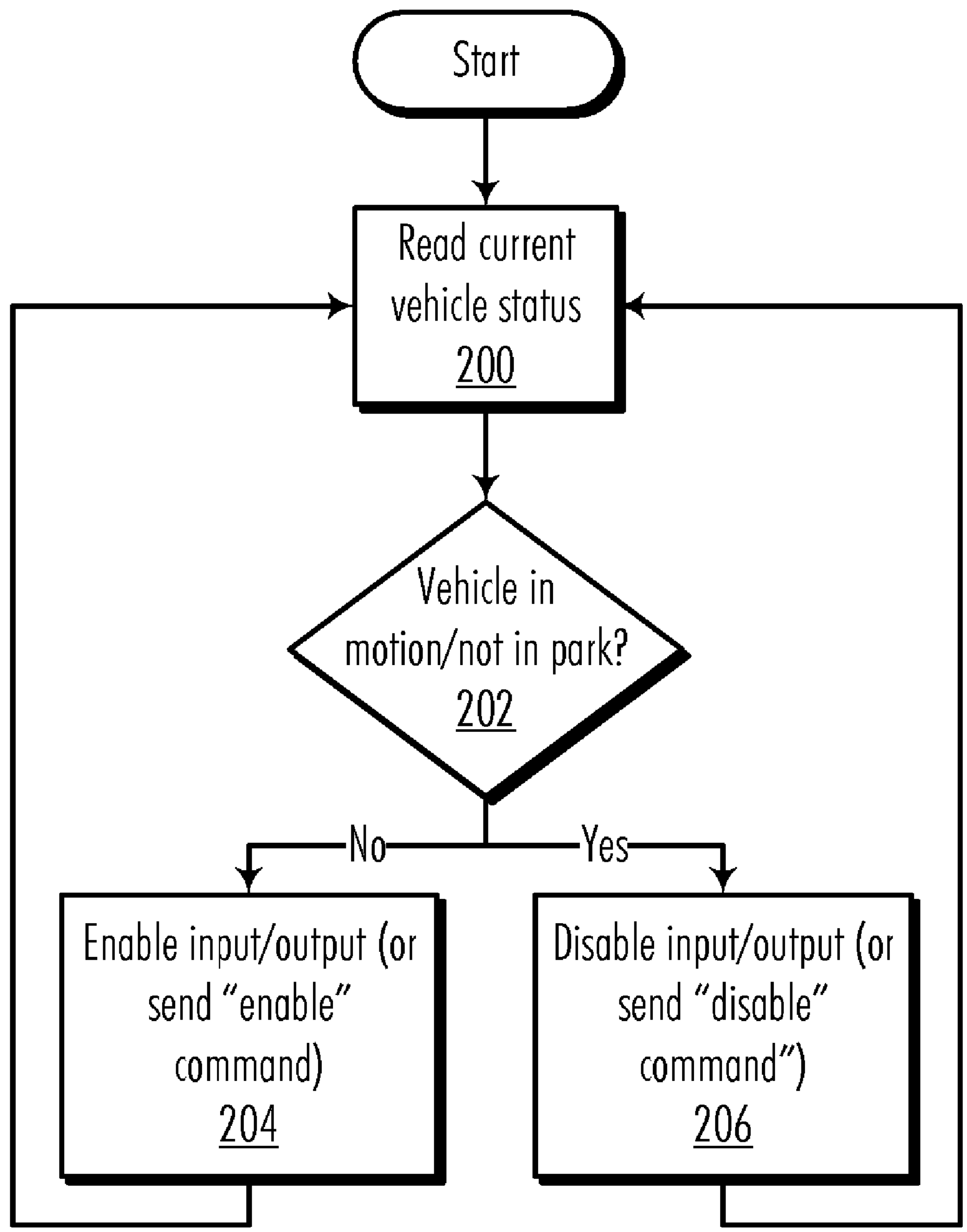
FIG. 2 is a flowchart representation of a process of providing access control in accordance with a preferred embodiment of the present invention.

FIG. 2 is a flowchart summarizing a process of providing mobile device access control in accordance with a preferred embodiment of the present invention. With respect to FIG. 1, this process may be programmed into any of devices 118, 119, 120, and 121, as described above. First, the current motion status of the vehicle is read (block 200). In the preferred embodiment described in FIG. 1, this is performed by reading one or more messages (velocity, transmission setting, etc.) from vehicle bus 122 via DLC 115 and PLC 117. A determination is then made as to whether the vehicle is moving or likely to be about to move (block 202).

If, from these messages, it is determined that the vehicle is in motion or may be about to become in motion (e.g., because the transmission has been shifted out of "Park") (block 202: Yes), then input/output for one or more mobile devices (e.g., devices 118, 119, 120, and 121) is disabled (block 206). This can be done in a number of ways. If the device executing the process in FIG. 2 is computer 119, computer 119 can disable input/output to one or more of its own input/output ports, interfaces, or peripherals. Alternatively, computer 119 can send commands to other devices (e.g., devices 118, 120, and 121) to direct those devices to disable user interaction (e.g., by blanking a display, locking a keypad, disabling a ringer, etc.) at those devices. If the device executing the process in FIG. 2 is some other device (e.g., device 118, 120, or 121), that device itself can disable local input and/or output, as appropriate. The process then cycles back to block 200 to continuously monitor the status of the vehicle and enable/disable user devices as appropriate.

If, on the other hand, it is determined that the vehicle is not in motion or has been placed in "Park" or some other non-moving status (block 202: No), input/output to the controlled devices (devices 118, 119, 120, and 121) is re-enabled, as appropriate to the devices. That is, the device executing the process in FIG. 2 re-enables its own input/output or directs controlled devices to do so. The process then cycles back to block 200 to continuously monitor the status of the vehicle and enable/disable user devices as appropriate.

Figure 3:
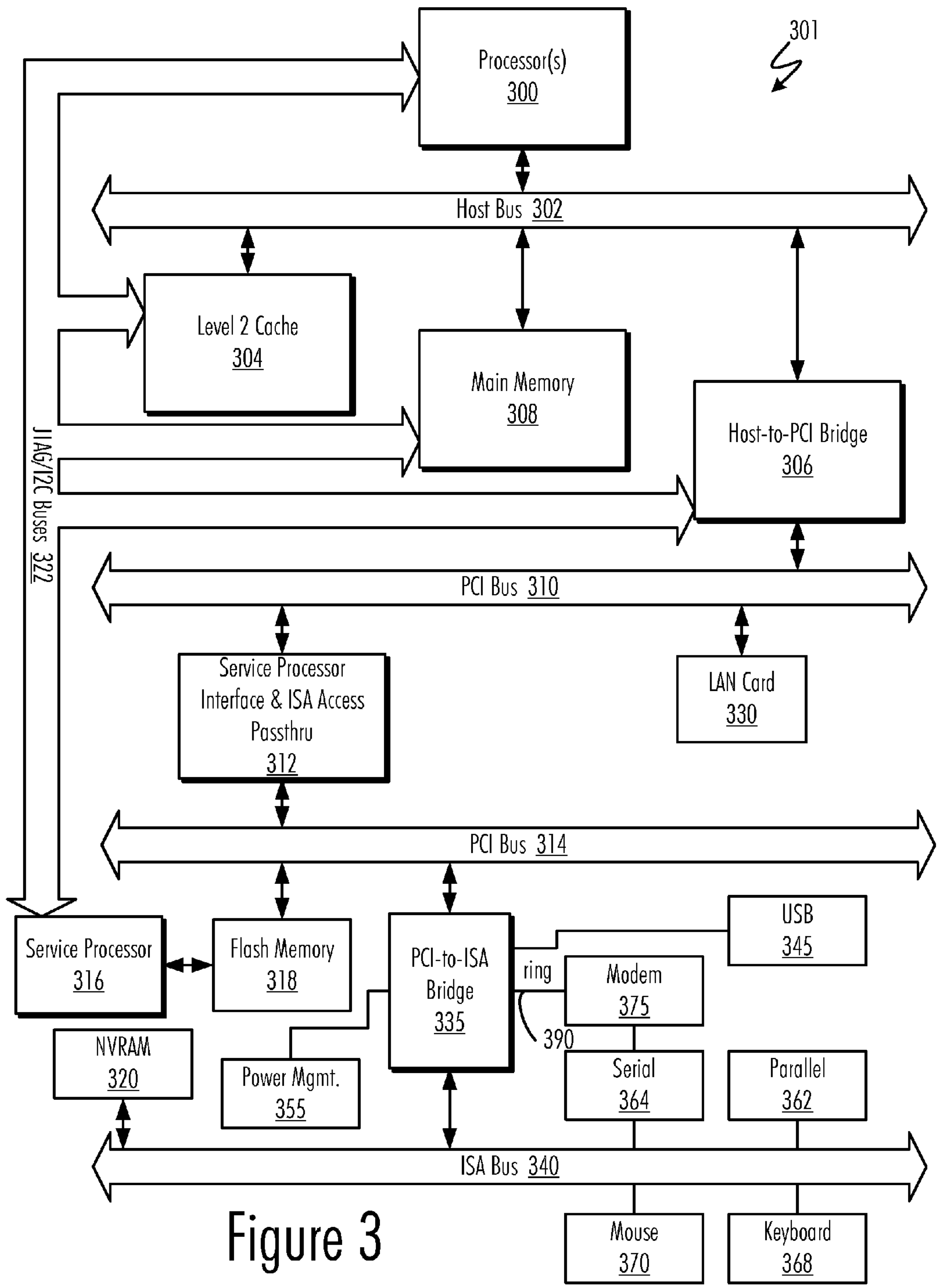
FIG. 3 is a block diagram of a data processing system in which a preferred embodiment of the present invention may be implemented.

FIG. 3 illustrates information handling system 301, which is a simplified example of a computer system capable of performing the computing operations of the on-board computer (computer 119 in FIG. 1) described herein with respect to a preferred embodiment of the present invention. Computer system 301 includes processor 300 which is coupled to host bus 302. A level two (L2) cache memory 304 is also coupled to host bus 302. Host-to-PCI bridge 306 is coupled to main memory 308, includes cache memory and main memory control functions, and provides bus control to handle transfers among PCI bus 310, processor 300, L2 cache 304, main memory 308, and host bus 302. Main memory 308 is coupled to Host-to-PCI bridge 306 as well as host bus 302. Devices used solely by host processor(s) 300, such as LAN card 330, are coupled to PCI bus 310. Service Processor Interface and ISA Access Pass-through 312 provides an interface between PCI bus 310 and PCI bus 314. In this manner, PCI bus 314 is insulated from PCI bus 310. Devices, such as flash memory 318, are coupled to PCI bus 314. In one implementation, flash memory 318 includes BIOS code that incorporates the necessary processor executable code for a variety of low-level system functions and system boot functions.

PCI bus 314 provides an interface for a variety of devices that are shared by host processor(s) 300 and Service Processor 316 including, for example, flash memory 318. PCI-to-ISA bridge 335 provides bus control to handle transfers between PCI bus 314 and ISA bus 340, universal serial bus (USB) functionality 345, power management functionality 355, and can include other functional elements not shown, such as a real-time clock (RTC), DMA control, interrupt support, and system management bus support. Nonvolatile RAM 320 is attached to ISA Bus 340. Service Processor 316 includes JTAG and I2C buses 322 for communication with processor(s) 300 during initialization steps. JTAG/I2C buses 322 are also coupled to L2 cache 304, Host-to-PCI bridge 306, and main memory 308 providing a communications path between the processor, the Service Processor, the L2 cache, the Host-to-PCI bridge, and the main memory. Service Processor 316 also has access to system power resources for powering down information handling device 301.

Peripheral devices and input/output (I/O) devices can be attached to various interfaces (e.g., parallel interface 362, serial interface 364, keyboard interface 368, and mouse interface 370 coupled to ISA bus 340. Alternatively, many I/O devices can be accommodated by a super I/O controller (not shown) attached to ISA bus 340.

In order to attach computer system 301 to another computer system to copy files over a network, LAN card 330 is coupled to PCI bus 310. Similarly, to connect computer system 301 to an ISP to connect to the Internet using a telephone line connection, modem 375 is connected to serial port 364 and PCI-to-ISA Bridge 335.

While the computer system described in FIG. 3 is capable of supporting the methods described herein, this computer system is simply one example of a computer system. Those skilled in the art will appreciate that many other computer system designs are capable of performing the processes described herein.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an;" the same holds true for the use in the claims of definite articles.

What is claimed is:

1. A computer-implemented method comprising:

detecting, from one or more messages on a vehicle bus associated with a vehicle, a vehicle motion condition of the vehicle, wherein the vehicle motion condition indicates whether it is possible for the vehicle to be currently in motion; and in response to the vehicle motion condition indicating that it is possible for the vehicle to be currently in motion, disabling at least one mobile device associated with the vehicle so as to prevent an operator of the vehicle from interacting with the at least one mobile device, wherein the disabling is performed via a physical link to the at least one mobile device.

2. The method of claim 1, wherein the at least one mobile device is disabled by relaying the one or more messages to the at least one mobile device, and wherein in response to the relaying, the at least one mobile device causes itself to become disabled so as to prevent the operator of the vehicle from interacting with the at least one mobile device.

3. The method of claim 2, wherein the one or more messages are converted into a computer-readable format before being relayed.

4. The method of claim 1, wherein the at least one mobile device includes an on-board mobile computer.

5. The method of claim 4, wherein the on-board mobile computer is disabled by inhibiting use of at least one peripheral device associated with the on-board mobile computer.

6. The method of claim 4, wherein the at least one mobile device is a plurality of mobile devices and wherein the on-board mobile computer transmits one or more commands to direct controlled mobile devices from the plurality of mobile devices to become disabled.

7. The method of claim 1, wherein the at least one mobile device includes a mobile telephone, pager, or personal digital assistant.

8. The method of claim 1, wherein the vehicle motion condition includes velocity information.

9. The method of claim 1, wherein the vehicle motion condition includes a state of a transmission associated with the vehicle.

10. An access control system associated with a vehicle, the system comprising:

a data interface configured to receive vehicle status information from the vehicle through an on-board diagnostic interface; and a mobile device interface configured to transmit information to at least one mobile device associated with the vehicle in response to vehicle motion condition data being received from the data interface, wherein the mobile device interface includes a physical link connected to the at least one mobile device, and wherein the vehicle motion condition data indicates whether it is possible for the vehicle to be currently in motion, wherein the transmitted information causes the at least one mobile device to become disabled so as to prevent an operator of the vehicle from interacting with the at least one mobile device when the vehicle motion condition data indicates that it is possible for the vehicle to be currently in motion.

11. The system of claim 10, further comprising a protocol conversion module, wherein the protocol conversion module converts the vehicle motion condition data into a computer-readable format.

12. The system of claim 11, wherein the converted vehicle motion condition data forms said transmitted information that is transmitted to the at least one mobile device via the mobile device interface.

13. The system of claim 10, further comprising an on-board computer, wherein the on-board computer transmits one or more commands to the at least one mobile device in response to receiving vehicle motion condition data from the data interface, wherein the one or more commands direct the at least one mobile device to become disabled when the vehicle motion condition data indicates that it is possible for the vehicle to be currently in motion, and wherein the one or more commands form said transmitted information that is transmitted to the at least one mobile device via the mobile device interface.

14. The system of claim 10, wherein the mobile device interface includes a wireless interface.

15. The system of claim 14, wherein the wireless interface includes a short-range radiofrequency communications module.

16. A computer-implemented method comprising:

detecting, through an on-board diagnostic interface associated with a vehicle, a vehicle motion condition of the vehicle, wherein the vehicle motion condition indicates whether it is possible for the vehicle to be currently in motion; and in response to the vehicle motion condition indicating that it is possible for the vehicle to be currently in motion, disabling at least one mobile device associated with the vehicle so as to prevent an operator of the vehicle from interacting with the at least one mobile device, wherein the disabling is performed via a physical link to the at least one mobile device.

17. The method of claim 16, wherein the at least one mobile device includes an on-board mobile computer and the on-board mobile computer is disabled by inhibiting use of at least one peripheral device associated with the on-board mobile computer.

18. An access control system associated with a vehicle, the system comprising:

a data interface configured to receive vehicle status information from the vehicle via a vehicle bus; and a mobile device interface configured to transmit information to at least one mobile device associated with the vehicle in response to vehicle motion condition data being received from the data interface, wherein the mobile device interface includes a physical link connected to the at least one mobile device, and wherein the vehicle motion condition data indicates whether it is possible for the vehicle to be currently in motion, wherein the transmitted information causes the at least one mobile device to become disabled so as to prevent an operator of the vehicle from interacting with the at least one mobile device when the vehicle motion condition data indicates that it is possible for the vehicle to be currently in motion.

* * * * *